April 10, 1928.
T. E. MURRAY, JR
1,665,468
INTERNAL COMBUSTION ENGINE
Filed April 5, 1922
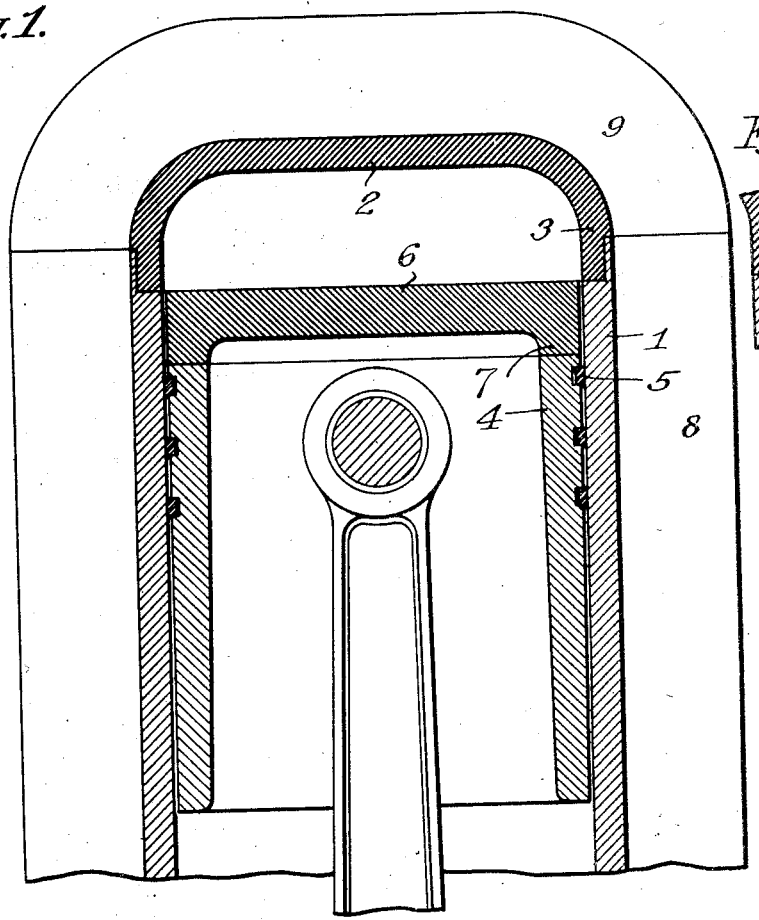
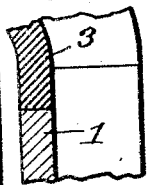
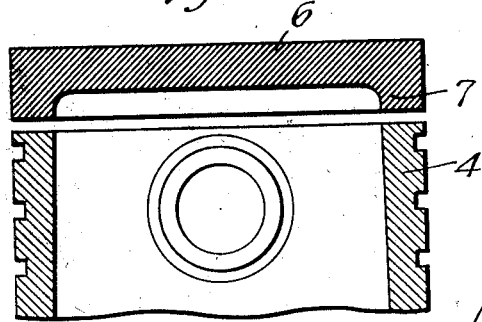
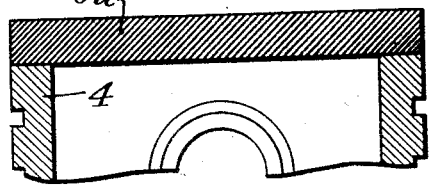
INVENTOR.
Thomas E. Murray, Jr
BY
D. Anthony Usina, ATTORNEY.

Patented Apr. 10, 1928.

1,665,468

UNITED STATES PATENT OFFICE.

THOMAS E. MURRAY, JR., OF NEW YORK, N. Y.

INTERNAL-COMBUSTION ENGINE.

Application filed April 5, 1922. Serial No. 549,877.

My invention aims to provide certain improvements in internal combustion engines designed particularly to carry off rapidly the heat of the combustion chamber, and having certain other advantages referred to in detail hereinafter.

The accompanying drawings illustrate an embodiment of the invention.

Fig. 1 is a longitudinal section through a cylinder and piston;

Fig. 2 is a similar section showing the parts of the piston before being united;

Fig. 3 is a similar section of an alternative style of piston;

Fig. 4 is a fragmentary section of an alternative style of cylinder.

It is advantageous to carry off the heat from the combustion chamber of an engine at a rapid rate. However, the materials of which the piston and cylinder, and other adjacent parts surrounding the combustion chamber, are made have to be chosen rather for their strength and other structural properties than for their conductivity. Steel and iron are the usual materials and these have a fair degree of conductivity, but not enough to prevent the accumulation of a very high temperature in the combustion chamber and adjacent parts. I propose to reduce the difficulty in this respect by lining the combustion chamber, at least in part, with copper or other material of high conductivity compared with the material of which the adjacent parts of the engine are constructed; or forming it, at least in part, of such copper or other high conductive material.

Ordinarily the combustion chamber is entirely or substantially formed by two parts, the cylinder and the piston. Where there are other parts enclosing the combustion chamber, the invention may be applied also to such other parts.

In the particular embodiment of the invention illustrated the cylinder 1 is made of cast iron or steel with a head 2 of copper surrounded by a flange 3 of the same material. The flange 3 of the head preferably terminates at about the line of the top of the piston in the highest position of the latter, leaving the iron or steel portion 1 to constitute the bearing for the piston and rings throughout the reciprocation of the latter. The piston similarly is formed with a cylindrical wall 4 preferably of seamless steel for greater wear, carrying the piston rings 5, and with a head 6 of copper surrounded by a flange 7 engaging the upper end of the part 4.

The flange 3 of the head of the cylinder may have a reduced portion at its lower edge fitting in a recess in the side wall 1, as shown in Fig. 1, or it may extend down its full thickness to engage the end of the side wall as shown in Fig. 4. In either case it is butt-welded around its entire edge to the edge of the cylindrical portion 1. This butt welding can be accomplished by methods described in previous patents of mine by which a strong union can be effected, or it may be welded or fastened in various other ways.

For the piston also the head 6 can be formed with the flange 7 (Fig. 2) and the edge of the flange butt-welded to the part 4. Or the head may be formed without flanges, as indicated at 6$^a$, Fig. 3, and welded with its underface directly on the edge of the part 4; but the use of a projecting flange 7 facilitates the welding operation. The same methods can be used in applying the copper head to the cylinder of the engine.

Fins 8 are provided on some types of cylinders for increasing the outside surface exposed to a cooling medium and extending up the sides of the cylinder, and in some cases similar fins 9 extend over the head. By arranging these fins so that they contact with the copper the cooling effect is facilitated.

Copper has a conductivity of about 7 to 1 compared with steel, so that the use of copper in the ways described is very advantageous. There are also other metals having a much greater conductivity than steel, and these may be substituted in place of the copper illustrated.

The term "iron" is used here to include cast iron and other usual and suitable substitutes therefor; such as, for example, steels of various composition. And the word "copper" is likewise used to include various alloys consisting chiefly of copper and having substantially equivalent physical properties.

In the welding of the head to the side wall of the cylinder, it is important to use a head of certain design and proportions. The flange 3 must have a considerable length. I have found in practice that it must have a length greater than the thickness of the head 2, in order to make a good weld between the head and the body of the cylinder. This is because of the high heat conductivity of the copper. In making such joints the electrodes are usually clamped around the work close to the abutting edges. And this is the method used for conveying current to the steel cylinder in the present case. But the same method of applying the electrodes cannot be used for the copper head because the central portion of the head would conduct the heat away and radiate it so fast as to prevent the proper heating of the edge. The electrodes are, therefore, applied to the top of the copper head and the flange 3 must be made long to present the necessary resistance required to bring up the temperature at the edge. For the same reason, it is important that the edge of the flange 3 be thinner than the head, and the reduced edge of the flange shown in Fig. 1 co-operates with the length of the flange in assuring a good welded joint.

Though I have described with great particularity of detail certain specific embodiments of my invention, yet it is not to be understood that the invention is restricted to the particular embodiments disclosed. Various modifications thereof may be made by those skilled in the art without departure from the invention as defined in the following claims.

What I claim is:

1. An internal combustion engine cylinder the side wall of which is of iron and the head of which is of copper throughout its thickness, the head having a flange of greater length than the thickness of the head and butt-welded at its edge to the side wall.

2. An internal combustion engine cylinder the side wall of which is of iron and the head of which is of copper throughout its thickness, the head having a flange of greater length and of less thickness at its edge than the head, said flange being butt-welded at its edge to the side wall.

3. An internal combustion engine cylinder the side wall of which is of iron and the head of which is of copper throughout its thickness, the head having a flange of greater length than the thickness of the head and butt-welded at its edge to the side wall, in combination with a piston having its head also of copper welded to a side wall of iron.

In witness whereof, I have hereunto signed my name.

THOMAS E. MURRAY, Jr.